United States Patent [19]

Suzuki et al.

[11] Patent Number: 4,884,373
[45] Date of Patent: Dec. 5, 1989

[54] NUMERICALLY CONTROLLED MACHINE TOOL

[75] Inventors: Ikuo Suzuki, Chiryu; Takao Yoneda; Takayuki Hotta, both of Nagoya; Toshihiro Yonezu, Nishio, all of Japan

[73] Assignee: Toyoda-koki Kabushiki-kaisha, Kariya, Japan

[21] Appl. No.: 98,186

[22] Filed: Sep. 18, 1987

[30] Foreign Application Priority Data

Sep. 22, 1986 [JP] Japan ............................... 61-224269

[51] Int. Cl.⁴ ............................................. B24B 51/00
[52] U.S. Cl. ................................. 51/165.71; 51/97 NC; 51/105 EC; 364/474.06
[58] Field of Search .......... 51/165 TP, 165.71, 165.75, 51/165.76, 165.77, 281 C, 97 NC, 326, 105 EL, 165.74; 364/474, 474.06

[56] References Cited

U.S. PATENT DOCUMENTS

| | | | |
|---|---|---|---|
| 3,344,559 | 10/1967 | Inaba et al. ............................ | 51/105 |
| 3,482,357 | 12/1969 | Inaba et al. ............................ | 51/105 |
| 3,576,979 | 5/1971 | McCall et al. ....................... | 235/151.11 |
| 3,917,930 | 11/1975 | Davey et al. ......................... | 235/151.11 |
| 4,099,113 | 7/1978 | Hayashi .................................. | 318/632 |
| 4,206,393 | 6/1980 | Chiba .................................... | 318/632 |
| 4,214,309 | 7/1980 | Koide et al. .......................... | 364/474 |
| 4,400,781 | 8/1983 | Hotta et al. ...................... | 51/165.71 X |
| 4,484,413 | 11/1984 | Yamamoto et al. ............ | 364/474 X |
| 4,501,093 | 2/1985 | Fisher .............................. | 51/165.71 |
| 4,502,125 | 2/1985 | Yoneda et al. ...................... | 364/474 |
| 4,571,686 | 2/1986 | Torisawa ............................ | 364/474 |
| 4,584,795 | 4/1986 | Akabane ............................ | 51/165.71 |
| 4,662,120 | 5/1987 | Imai et al. ...................... | 51/165.71 X |
| 4,662,122 | 5/1987 | Ohmura et al. ................... | 51/165.71 |
| 4,672,551 | 6/1987 | Ookuma et al. ..................... | 364/474 |
| 4,740,902 | 4/1988 | Yoneda et al. ...................... | 364/474 |
| 4,750,105 | 6/1988 | Ohkawa et al. ............... | 364/474 X |

FOREIGN PATENT DOCUMENTS

| | | | |
|---|---|---|---|
| 52-133198 | 11/1977 | Japan ................................ | 51/165 R |
| 52-144895 | 12/1977 | Japan ................................ | 51/165 R |
| 0114445 | 6/1985 | Japan ................................ | 364/474 |

OTHER PUBLICATIONS

Werkstattstechnik, vol. 76, No. 6, Jun. 1986, pp. 343-347, Berlin; Brill et al; "CNC-gesteuertes Nockenschleifen", pp. 343-346.

Werkstatt und Betrieb, vol. 118, No. 8, 1985, pp. 443-448, Munichi; Wedeniwski "Prozessrechnergesteuertes Produktions–nockenschleifen", pp. 443-446.

Primary Examiner—Robert P. Olszewski
Assistant Examiner—Shirish Desai
Attorney, Agent, or Firm—Oblon, Spivak, McClelland, Maier & Neustadt

[57] ABSTRACT

A numerically controlled machine tool for machining a non-circular workpiece according to profile data. The numerical controller of the machine tool memorizes the ideal profile data calculated from the ideal final shape of the workpiece, and the execution profile data calculated from the ideal profile data and compensated for position error due to the follow delay of the machine tool. The machine tool is controlled according to the execution profile data during grinding the workpiece with cut-in feed and spark-out grinding. The numerical controller has the capability of measuring position change of the main spindle and the tool slide during spark-out grinding. Then, the numerical controller ascertains whether or not the follow delays of the main spindle and the tool slide are within a prescribed tolerance depending on the measured position change and the ideal profile data.

3 Claims, 8 Drawing Sheets

NUMERICALLY CONTROLLED MACHINE TOOL

BACKGROUND OF THE INVENTION

1. Field of the Invention

The present invention relates to a numerically controlled machine tool capable of machining a non-circular workpiece such as a cam shaft.

2. Description of the Prior Art

Generally, in a numerically controlled grinding machine, the feed of the grinding wheel perpendicular to a spindle axis is controlled by a numerical control apparatus according to profile data and machining cycle data.

The profile data comprises data relating to the amount of movement of the grinding wheel per unit angle rotation of the spindle which defines the reciprocating motion of the grinding wheel along the finished shape of the workpiece. On the other hand, the machining cycle data comprises data relating to a numerical control program to control a machining cycle which includes rapid feed, cutting feed and retracting feed of the grinding wheel.

In the numerically controlled grinding machine tool of the aforementioned type, the ability of the main spindle and the grinding wheel feed axis to accurately follow command data is needed so as to grind the workpiece precisely.

However, it is very difficult to accurately follow command data without a delay occurring. To compensate for such follow delay, the main spindle and the grinding wheel feed axis are numerically controlled according to the execution profile data, which is calculated from the ideal profile data and which is compensated for the follow delay. Since the follow delay is changed depending on the temperature of the feed mechanism, and is changed with a lapse in time, it is very difficult to maintain the accuracy of a finished workpiece within a desired tolerance even when using compensated execution profile data. Accordingly, it is necessary to measure the profile of finished workpiece and to ascertain whether or not the profile error of the finished workpiece is within the prescribed tolerance.

Since prior numerically controlled grinding machines do not have the ability to accomplish the above-mentioned measurement automatically, there is a possibility of producing many substandard products.

SUMMARY OF THE INVENTION

Accordingly, it is a primary object of the present invention to provide an improved numerically controlled machine tool capable of automatically ascertaining whether or not machining accuracy is maintained within a tolerance during machining operation.

Another object of the present invention is to provide an improved numerically controlled machine tool capable of automatically measuring follow delay of the spindle and the tool slide so as to ascertain whether or not the machining accuracy is maintained within a prescribed tolerance without measuring the profile of the finished workpiece.

Briefly, according to the present invention, there is provided a numerically controlled machine tool for grinding a non-circular shaped workpiece such as a cam. The numerically controlled machine tool comprises ideal profile data memory means for storing ideal profile data which is calculated from the ideal final shape of a workpiece, and execution profile data memory means for storing execution profile data calculated from the ideal profile data and compensated for position error due to the follow delay of the machine tool. The numerically controlled machine tool can operate according to the ideal profile data. The machine tool also has measuring means for measuring position changes of the tool and the main spindle during operation according to the execution profile data, and for producing measured profile data, which consists of the position change data of the tool relating to the angular positions of the main spindle. Then, it is ascertained by decision means whether or not the follow delays of the main spindle and the tool are within a prescribed tolerance by comparing the measured profile data and the ideal profile data.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, in which.

DESCRIPTION OF THE PREFERRED EMBODIMENT

Figure 1:
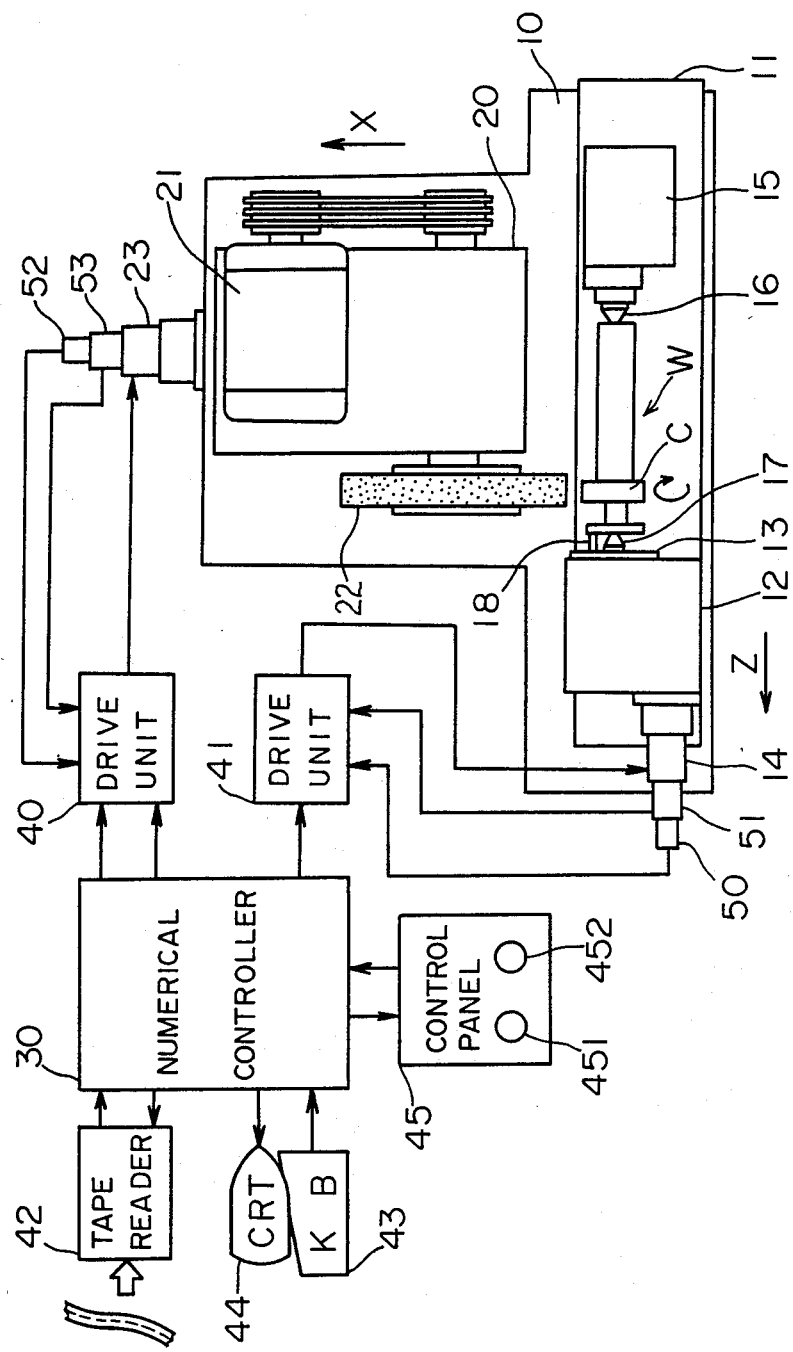
FIG. 1 is a schematic view of a numerically controlled machine tool according to the present invention.

Referring now to the drawings and, more particularly, to FIG. 1 thereof, a numerically controlled grinding machine is shown comprising a bed 10 on which a table 11 is slidably guided along a Z axis which is parallel to a main spindle 13. A workhead 12 is mounted on the left-hand end of the table 11. The workhead 12 has rotatably carried therein the main spindle 13, which is connected to a servomotor 14 so as to be rotated thereby. A tail stock 15 is also mounted on the right-hand end of the table 11. A workpiece W having cam C is carried between the center 17 of the main spindle 13 and the center 16 of the tail stock 15. The left end of the workpiece W is engaged with a positioning pin 18, which is fixed on the main spindle 13, so as to synchronize the phase of the workpiece W with the phase of the main spindle 13.

A tool slide 20 is slidably guided on a rear portion of the bed 11 for movement toward and away from the workpiece W along an X axis. A grinding wheel 22, rotatably supported as a tool on the tool slide 20, is rotated by a motor 21. The tool slide 20 is connected to a servomotor 23 through a feed screw (not shown) so that advancing and retraction movement of the tool slide 20 is effected by the servomotor 23.

Drive units 40, 41 include circuits to drive servomotor 23, 14, respectively, in response to command pulses, which are generated by the numerical controller 30. Pulse generators 50, 52 and tachogenerators 51, 53 are connected to servomotors 14, 23, respectively, and outputs from the pulse generators 50, 52 and tachogenerators 51, 53 are lead to the drive units 40, 41, respectively, so as to drive servomotor 14, 23 by using velocity feedback and position feedback.

The numerical controller 30 controls the rotation of the servomotor 23, 14 numerically so as to grind the workpiece W. A tape reader 42 for inputting ideal profile data and machining cycle data, a keyboard 43 for inputting control data, a CRT display device 44 for displaying various information and a control panel 45 for inputting an operator command are connected to the numerical controller 30.

Figure 2:
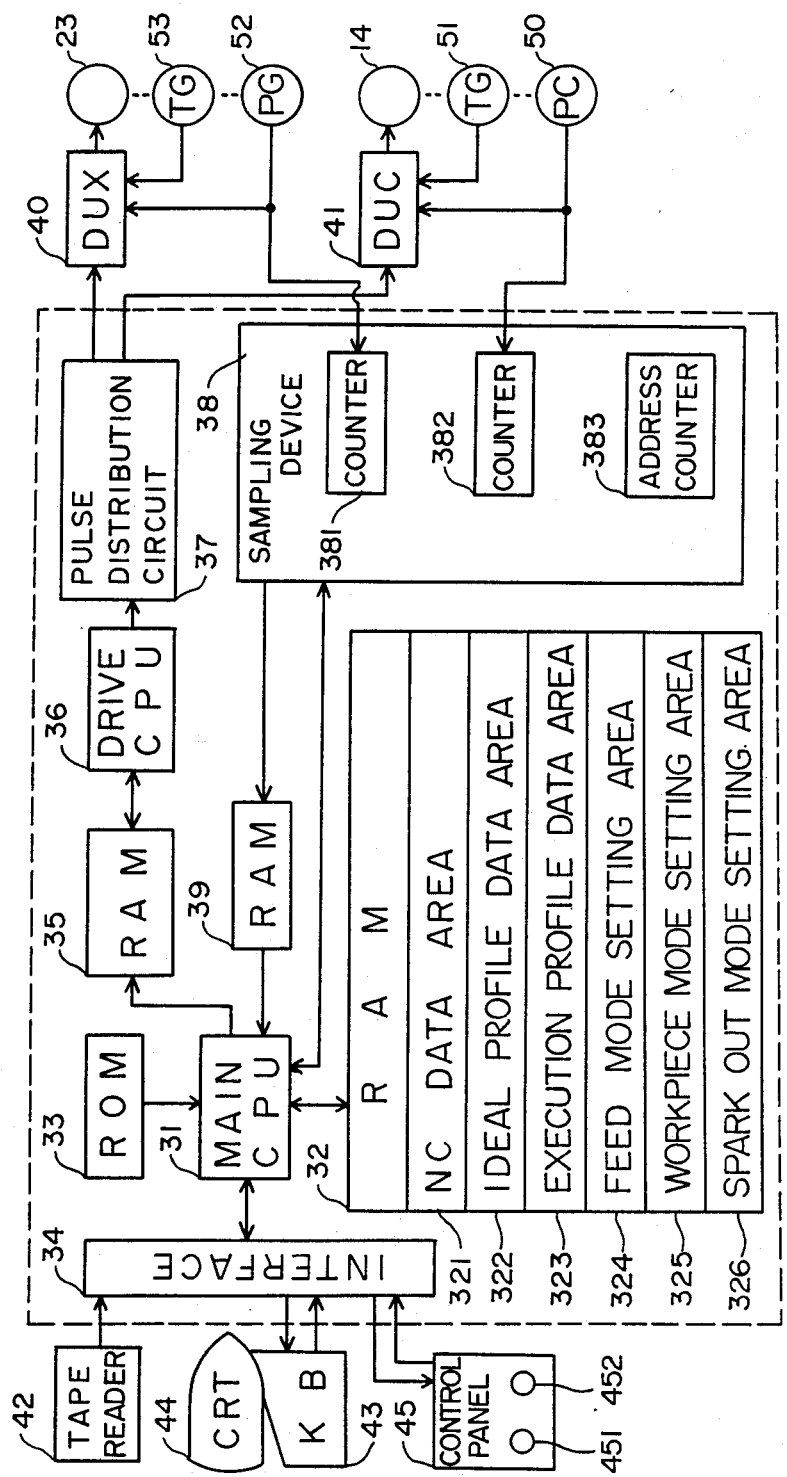
FIG. 2 is a block diagram showing the structure of the numerical controller 30 shown in FIG. 1.

The numerical controller 30 comprises a main central processing unit (hereinafter referred to a "main CPU") 31, a read only memory (ROM) 33, in which control program is stored, a random access memory (RAM) 32 and an interface 34 as shown in FIG. 2. In the RAM 32, there is a NC data area 321 for storing numerical control programs, an ideal profile data area 322 for storing ideal profile data calculated from the ideal final shape of the workpiece, and an execution profile data area 323 for storing compensated ideal profile data as execution profile data. The RAM 32 also has a feed mode setting area 324, a workpiece mode setting area 325, and a spark-out mode setting area 326.

The numerical controller 30 also comprises a drive CPU 36, a RAM 35 and a pulse distribution circuit 37 so as to distribute command pulses to drive units 40, 41. The RAM 35 stores positioning data sent from main CPU 31. The drive CPU 36 executes calculations for slow up, slow down and interpolation depending on the positioning data sent from the main CPU 31 via the RAM 35, and outputs an amount of movement data and velocity data at a predetermined interval. The pulse distribution circuit 37 distributes feed command pulses to drive units 40, 41 according to the amount of movement data and velocity data.

The numerical controller includes a sampling device 38 and a RAM 39 as elements of profile measurement means. The sampling device 38 comprises counters 381, 382 which count the feedback pulses generated from pulse generators 52, 50, respectively. These counters 381, 382 are reset when the main CPU 31 outputs a reset signal, and start to count the feedback pulses of the tool feed axis (X axis) and the main spindle (C axis) when the main CPU 31 outputs a measuring start signal. Furthermore, the sampling device 38 comprises an address counter 383, which is reset by the main CPU 31 and is incremented at each sampling. In response to the measuring start signal from main CPU 31, the sampling device 38 reads the count values of counter 381, 382 at predetermined sampling time intervals, and stores them in successive memory locations of ,the RAM 39, the address of which is designated by the address counter 383.

Operation of the numerical controller 30 is described hereinbelow.

Figure 8:
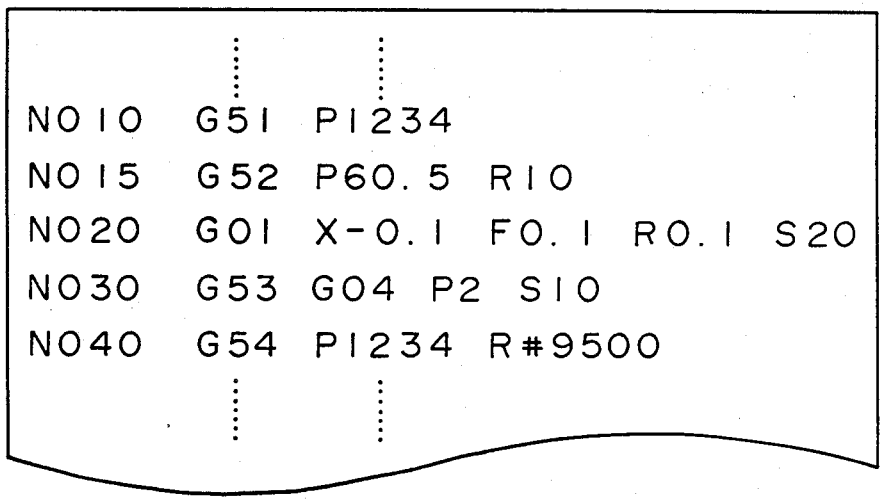
FIG. 8 shows a numerical control program for machining a workpiece.

In the RAM 32, an NC program for a machining cycle shown in FIG. 8 is stored. The NC program is decoded by the main CPU 31 according to steps as specified by the flow chart shown in FIGS. 3(a) and 3(b). One block of an NC program is read out from the NC program area of the RAM 32 at step 100, and it is ascertained whether or not the data of the block shows the end of the program at step 102. If the data shows completion of the NC program, the execution of this program is ended. But if not, the process of the main CPU 31 is moved to step 104, and it is ascertained whether or not the block includes code G at step 104. If code G is ascertained to step 104, the process of the main CPU 31 is moved to step 106 so as to ascertain the command code in greater detail. In step 106 through step 120, mode flags in the mode setting area 324~326 of the RAM 32 are set, depending on the detail command code. If code G01 is ascertained at step 106, the flag in the feed mode setting area 324 is set at step 108 so as to set a feed mode in a grinding feed mode. Similarly, if code G04 is ascertained at step 110, the flag in the spark out mode setting area 326 is set at step 112 so as to set the feed mode in a spark-out mode. If code G51 is ascertained at step 120, the flag in the workpiece mode setting area 325 is reset to set the workpiece mode in a cam mode.

After the above-mentioned mode setting has occurred, the process of the main CPU 31 is moved to step 122 for certain steps depending on the NC program and mode. If code G52 is ascertained at step 122, a reset signal is sent to the sampling device 38, then, sampling condition data are set in the sampling device. If G53 is ascertained at step 124, the measurement start signal is sent to the sampling device 38 at step 126. If code G54 is ascertained at step 128, the sampled data in the RAM 39 is read at step 130, and then, it is ascertained whether or not the follow delays of the main spindle 13 and the tool slide 20 are within a predetermined tolerance depending on the sampled data and the ideal profile data.

Furthermore, if code x is ascertained at step 132, the process of the main CPU 31 is moved to step 134, and it is ascertained whether or not the workpiece mode is set in the cam mode and the feed mode is set in the grinding feed mode (hereafter referred to as the cam grinding mode). If the mode is the cam grinding mode, pulse distribution for grinding the cam is executed at step 140. If not, a regular pulse distribution, which is not synchronized with main spindle rotation, is executed at step 136.

Before starting grinding operation, the execution profile data is calculated automatically by the main CPU 31 and is stored in the execution profile data area 323 of the RAM 32. The execution profile data is calculated from the ideal profile data and which is compensated for follow delays of the main spindle 13 and the tool slide 20. Namely, the numerically controlled grinding machine is operated depending upon the ideal profile data. During such operation, the position changes of the main spindle 13 and the tool slide 20 are measured, and the position error due to the follow delays is calculated. Then, the execution profile data is calculated depending upon the ideal profile data and the calculated position error.

Operation of the numerical controller 30 depending upon the NC program for the machining cycle is described hereinbelow.

Figure 3A:
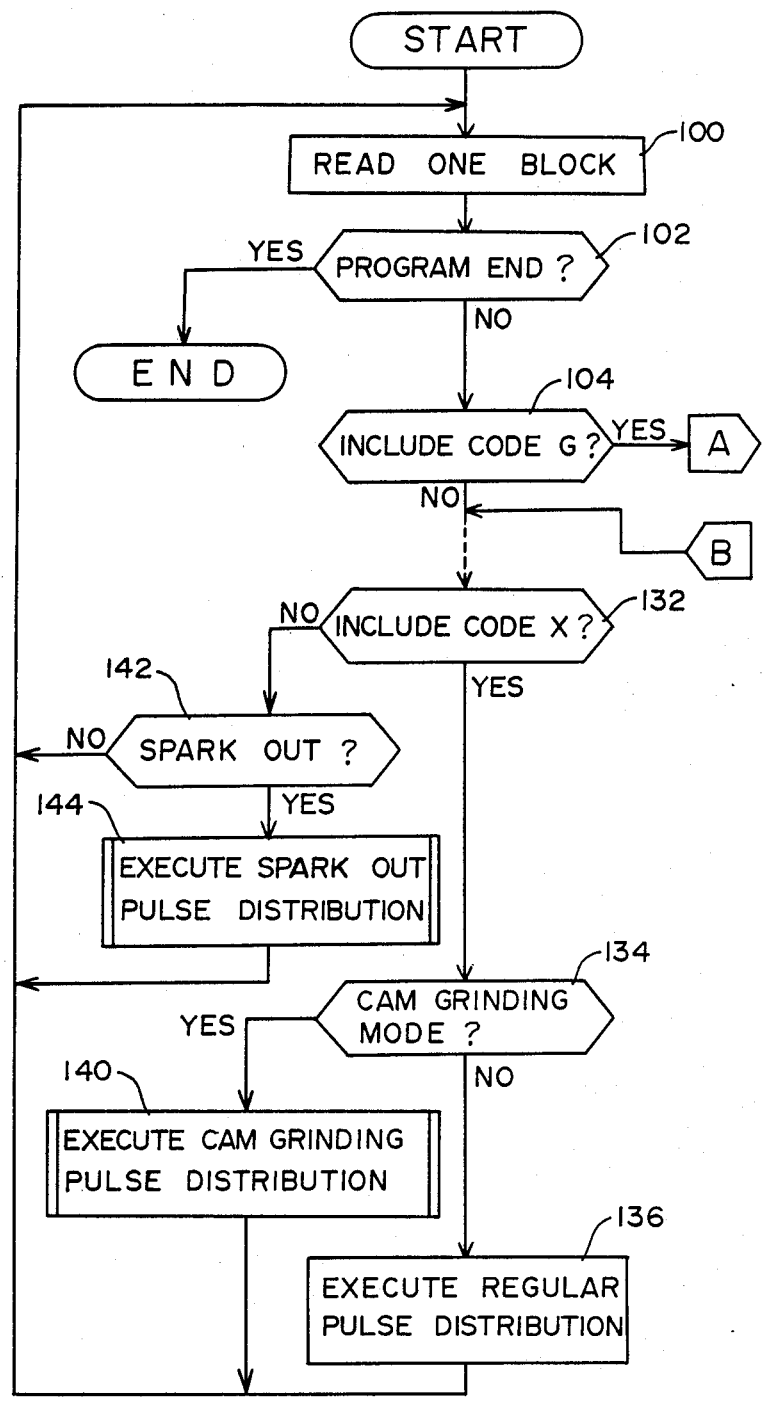
FIGS. 3(a) and 3(b) are flow charts explaining the general operation of the main CPU 31 shown in FIG. 2.
Figure 3B:
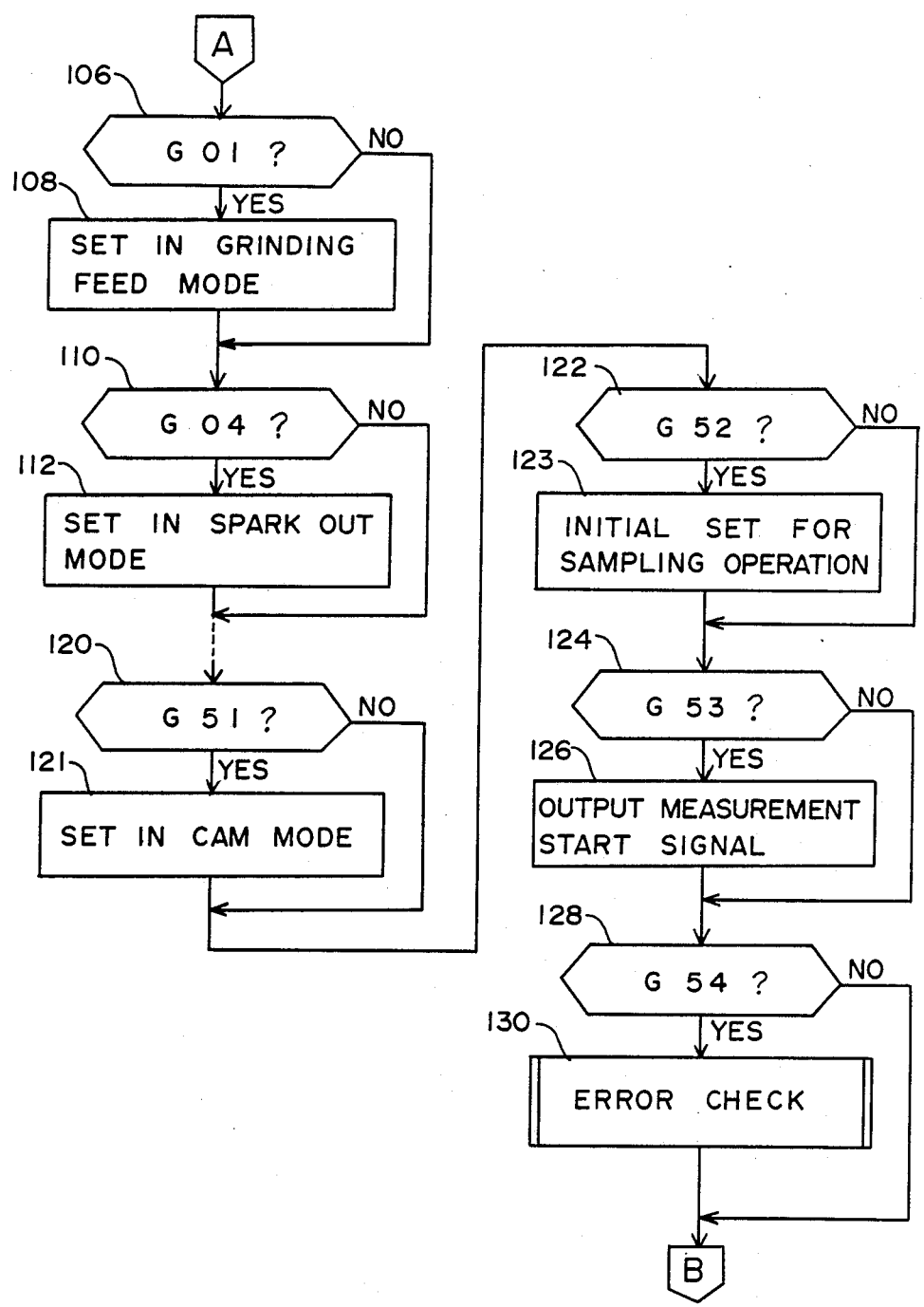

When the switch 452 on the control panel 45 is pushed, the NC program for the machining cycle shown in FIG. 8 is decoded block by block according to the process shown in FIG. 3(a) and FIG. 3(b). First, in response to code G51 in block N010, the workpiece mode is set in a cam mode, and one set of the ideal profile data designated by profile number P1234 is selected at step 121.

In response to code G52 in the next block N015, the initial setting procedure for sampling is accomplished at step 123. Then, the feed mode is set in a grinding feed mode in response to the code G01 in block N020 at step 108, and the cam grinding procedure is completed at step 140 in response to feed data X-0.1. Data with code F in block N030 indicates the feed amount per revolution of the main spindle 13, and data with code R indicates the feed speed per revolution of the main spindle 13. Data with code S indicates the rotational speed of the main spindle 13. When data with code F and data with code R are the same value, the grinding wheel G is fed continuously at a constant speed until the total cut-in feed amount reaches a programmed total feed value with code X.

Figure 4:
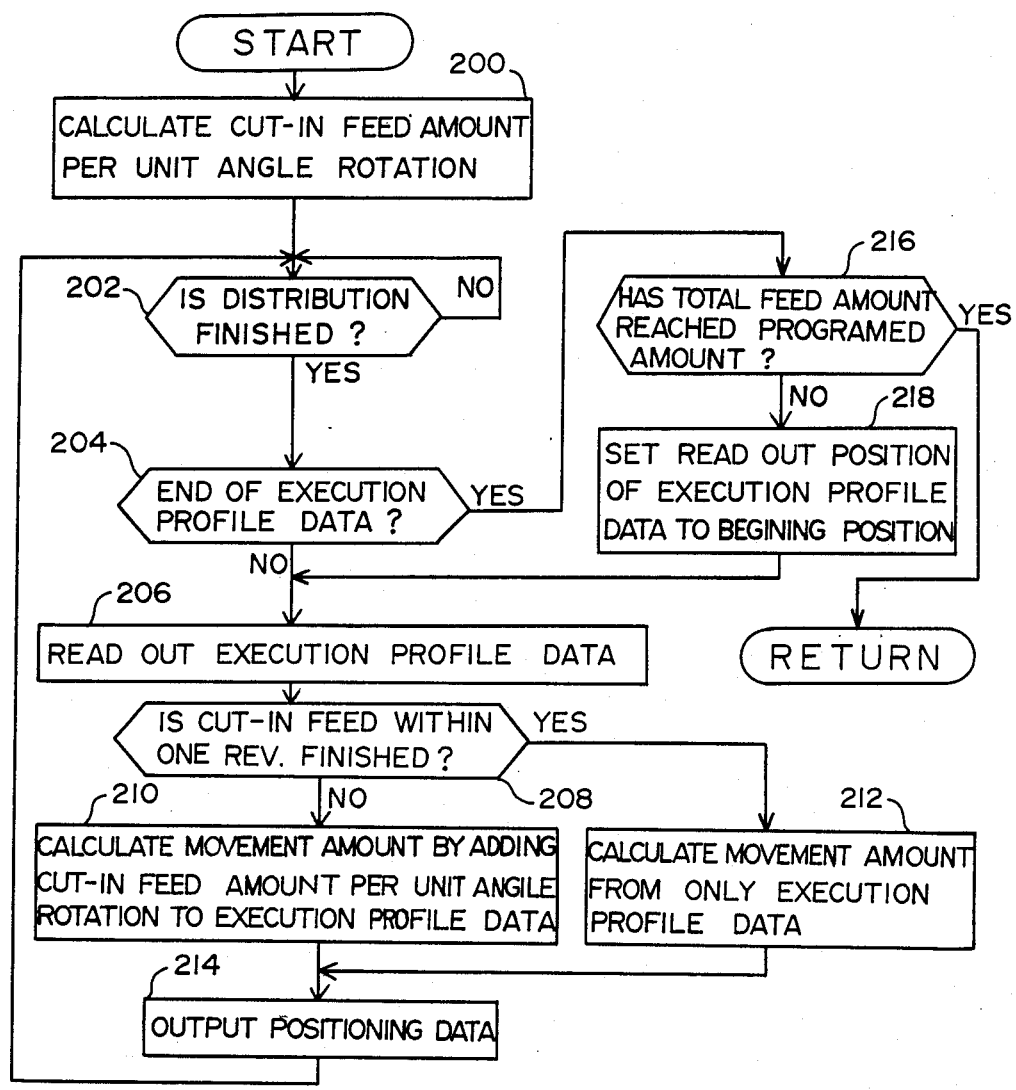
FIG. 4 is a flow chart for illustrating the details of step 140 shown in FIG. 3(a)

The cam grinding operation is accomplished by the process at step 140. The details of the process at step 140 are shown in FIG. 4. First, the pulse number corresponding to the cut-in feed amount per unit rotational angle (0.5°) is calculated depending upon the data with code R at step 200. Then, positioning data (amount of movement and velocity) of the main spindle 13 and the tool slide 20 are output repeatedly to the drive CPU 36 via the RAM 35 at predetermined intervals. The main CPU 31 outputs the next positioning data when the drive CPU 36 outputs a pulse distribution finish signal.

Namely, the pulse distribution finish signal is input at step 202 so as to ascertain whether or not the previous pulse distribution is finished. If the previous pulse distribution is finished, it is ascertained whether or not the data, which is read at the previous cycle, is the last data of the execution profile data at next step 204 so as to detect one revolution of the main spindle 13. If the previous data is not the last data of the execution profile data, the process of the main CPU 31 is moved to step 206, and then the next execution profile data is read out. Afterward, it is ascertained whether or not the cut-in feed within one revolution is finished or completed at step 208. This is ascertained depending on the data with code F. In this case, it is ascertained whether or not the cut-in feed is finished by ascertaining whether or not the feed amount within one revolution reaches 0.1 mm. If the cut-in feed within one revolution is not finished, the amount of movement data is calculated by adding the cut-in amount pre-unit angle to execution profile data at step 210. Then, the positioning data is output to the drive CPU 36 at step 214. On the other hand, if the cut-in feed within one revolution is finished, the moving amount is calculated from only the execution profile data at step 212. Then, the positioning data is output at step 214. Afterward, the process of the main CPU 31 is moved back to step 202. If it is ascertained that the data previously read is the last data of the execution profile data at step 204, it is ascertained whether or not the total cut-in feed amount reaches a programmed total feed amount, which is programmed with code X at step 216. If the total cut-in feed amount does not reach the programmed amount, the process moves to step 206 via step 218 so as to continue the above-mentioned process repeatedly. At step 218, the read out position of the execution profile data is set to the beginning position of the execution profile data so as to produce a series of positioning data for the next rotation cycle. If the total cut-in feed amount reaches the programmed amount, the process for grinding the cam according to the NC program in block N020 is finished. Subsequently, a measurement start signal is sent to sampling device 38 in response to code G53 in block N030 at step 126.

Figure 5:
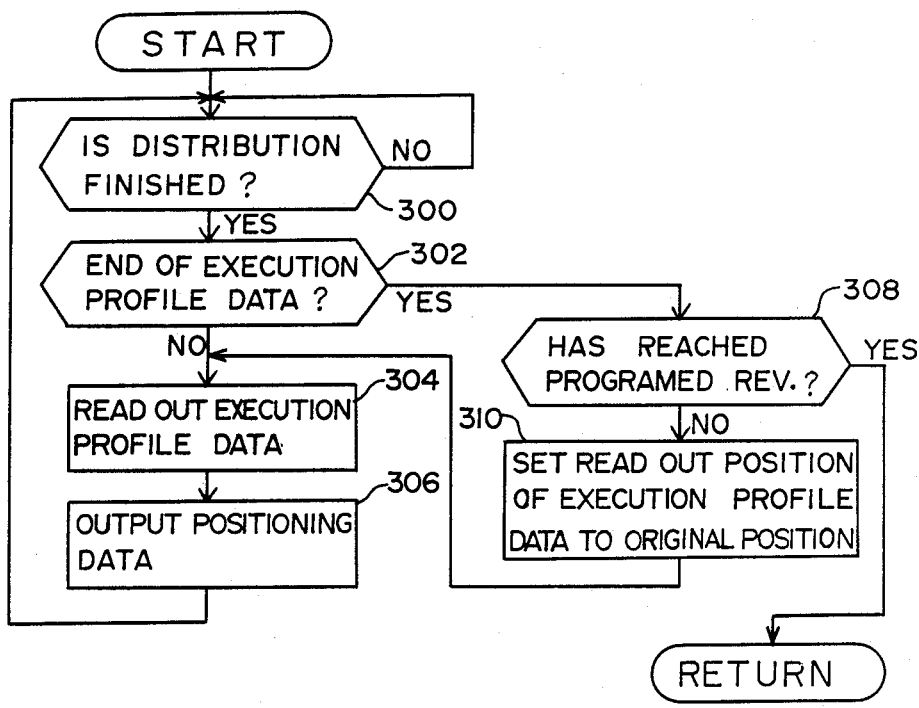
FIG. 5 is a flow chart for illustrating the details of step 144 shown in FIG. 3(a)

Afterwards, in response to code G04 in block N030, pulse distribution for spark-out motion is executed according to the procedure shown in FIG. 5. Code P2 in block N030 means that the total rotational amount of the main spindle 13 during spark-out is two revolutions, and code S10 means that the rotational speed of the main spindle 13 during spark-out is 10 rpm.

The process shown in FIG. 5 is similar to the process shown in FIG. 4. However, there is no cut-in feed in this process and spark-out grinding is finished when the number of revolutions of the main spindle 13 reaches a programmed value. Namely, if it is ascertained that the previous pulse distribution process is completed at step 300, it is ascertained whether or not the data previously read is the last data of the execution profile data at step 302. If the data is not the last data of the execution profile data, the next profile data is read out at step 304, then positioning data depending upon the profile data is output to the drive CPU 36 at step 306. The process at step 304 and step 306 is repeated until the last data of the execution profile data is read out so as to produce the profile generation movement of the grinding wheel G. If it is ascertained that the last data is read out, such means that the main spindle 13 is turned one revolution. In such case, the process of main CPU 31 is moved to step 308. At the step 308, it is ascertained whether or not the rotation of the main spindle 13 reaches a programmed value (two revolutions). If it is ascertained that the main spindle 13 rotates two revolutions, the process shown in FIG. 5 is ended. If not, the process of the main CPU 31 is moved to step 304, and then, the above-mentioned process is repeated again.

Figure 6:
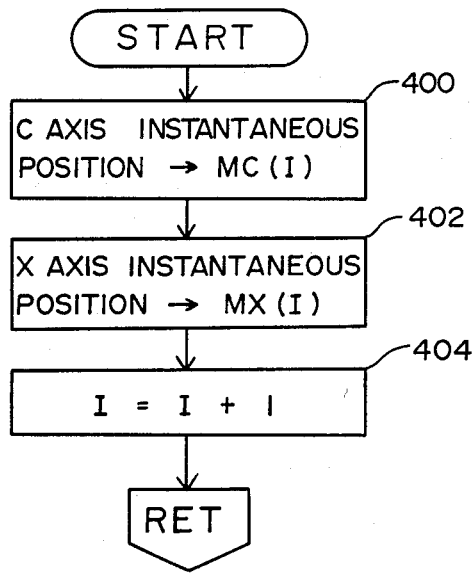
FIG. 6 is a flow chart for explaining the sampling operation of the sampling device 38 shown in FIG. 2.

By the above-mentioned processes, the grinding wheel G is moved according to the execution profile data without cut-in feed (spark-out cycle). During this spark-out cycle, the sampling device 38 samples the current positions of the main spindle 13 and the tool slide 20, and stores sampled data in RAM 39. Namely, the sampling device 38 executes the process shown in FIG. 6 at a predetermined sampling time interval. At step 400, the contents of counter 382 are stored in memory address MC(I) designated by the count value I of counter 383 of the RAM 39. The contents of counter 381 are also stored in memory address MX(I) designated by the count value I of counter 383. Then, the address counter 383 is incremented by 1 at step 404. The above-mentioned process is repeated at the predetermined sampling interval until the main spindle 13 rotates one revolution so as to sample real positions of the main spindle 13 and the tool slide 20 at the predetermined sampling interval.

Figure 7:
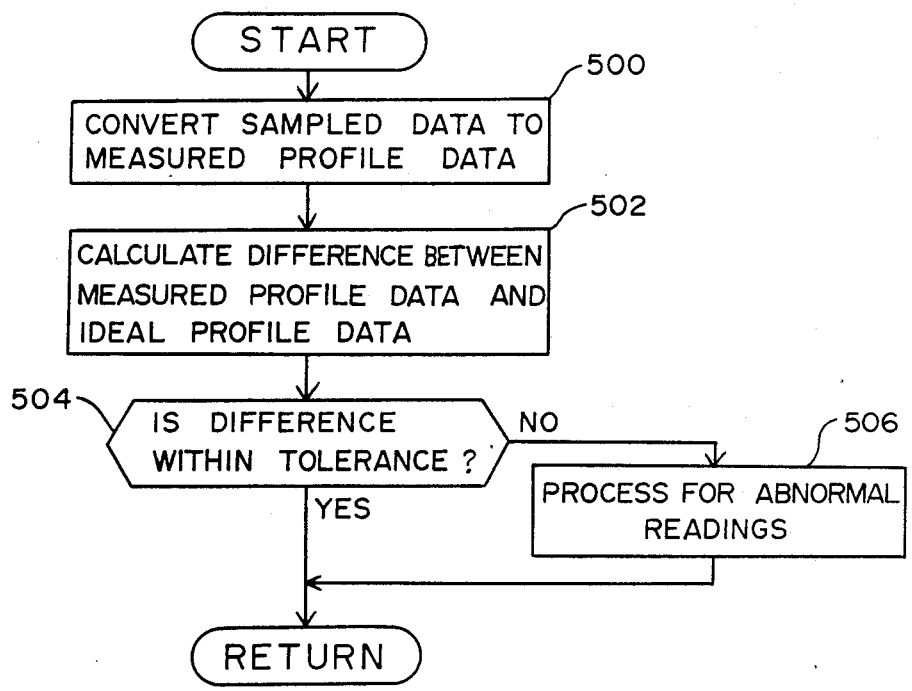
FIG. 7 is a flow chart illustrating the details of step 130 shown in FIG. 3(b)
Figure 9:
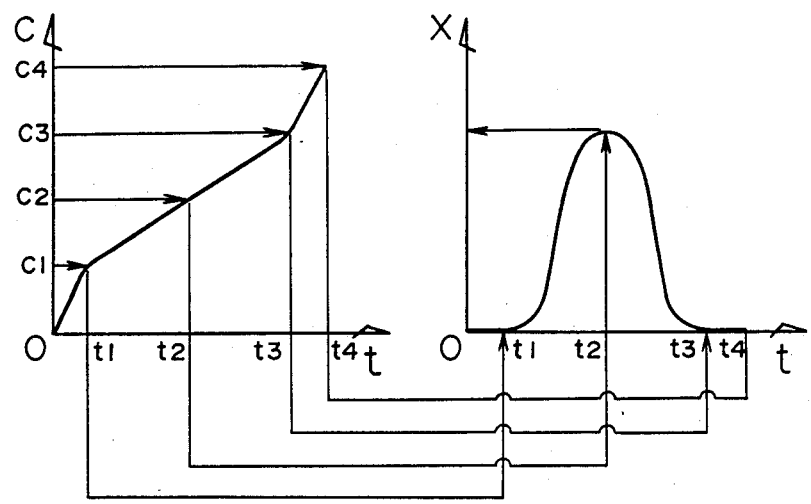
FIG. 9 is an explanatory chart which explains the method of obtaining measured profile data from sampled data.
Figure 10:
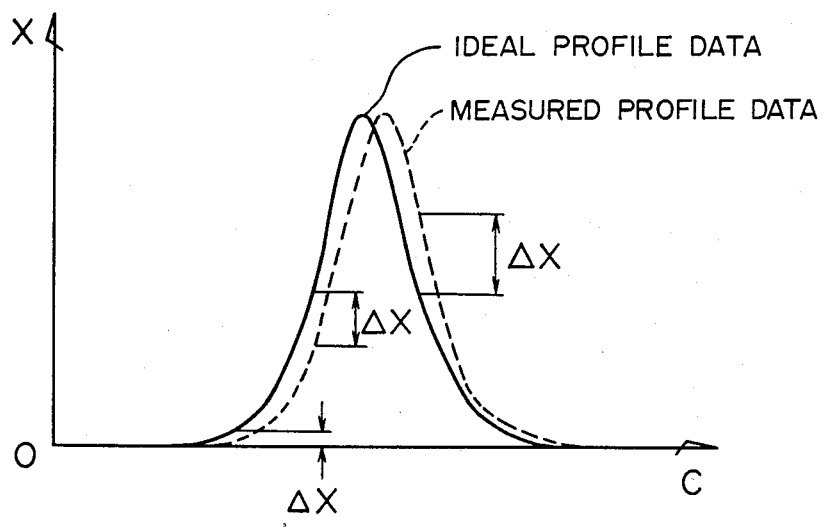
FIG. 10 is an explanatory chart for explaining the method of calculating the error of measured profile data as compared with ideal profile data.

Subsequently, in responding to code G54 in block N040, the error checking process is executed at step 130 in FIG. 3(b). The detailed process at step 130 is shown in FIG. 7. The sampled data of the C axis and X axis indicate position changes at each sampling time shown in FIG. 9. At step 500, the X axis sampled data is converted to X axis position data relating to the angle positions of the C axis shown in FIG. 10. First, the time (for example t1, t2, t3, t4), which is in accordance with each angle rotation position (for example C1, C2, C3, C4) of C axis, is calculated by interpolating the sampled data of the C axis. Then, the X axis position at each calculated time (for example t1, t2, t3, t4) is calculated by interpolating the sampled data of the X axis. From the result of the above-mentioned calculated, the X axis position data relating to the angle positions of the C axis is determined as measured profile data. Then, position errors ΔX at each unit angle position are calculated depending on the difference between the ideal profile data which is designated by the data with code P in block N040 and the measured profile data at step 502. Afterward, it is ascertained whether or not all errors ΔX are within a predetermined tolerance which is a stored parameter designated by the data with code R in block N040. If all errors are within the predetermined tolerance, the process shown in FIG. 7 is finished. On the other hand, if one or more errors exceed the tolerance, the process for abnormal readings (for example, outputting the alarm signal) occurs at step 506 so as to indicate the occurrence of machining malfunction.

In the above-mentioned embodiment, sampling device 38 samples current positions of the C axis and Y axis at predetermined time intervals. However, a sampling device modified as noted below can be used. In this modified sampling device, there is a circuit for outputting a timing signal at each unit angle of rotation of the main spindle depending on the output of counter 382. Then, the instantaneous positions of X axis are sampled when the timing signals are output. In this embodiment, the measured profile data, which consists of X axis instantaneous position data at each unit rotational position of C axis, are produced directly from sampled X instantaneous positions of the X axis without data conversion.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A numerically controlled machine tool, which has a main spindle and tool slide controlled numerically, for grinding a non-circular workpiece according to a profile data which defines a profile generating movement of a tool along the final shape of said non-circular workpiece, said numerically controlled machine tool comprising:

ideal profile memory means for storing ideal profile data, which is calculated from said ideal final shape of said workpiece, and composed of position data of said tool with respect to the rotational position change of said main spindle;

execution profile data memory means for storing execution profile data calculated from said ideal profile data and which is compensated for position error due to follow delay of said numerically controlled machine tool;

control means for moving said spindle and said tool slide according to said execution profile data so as to reproduce profile generation movement;

measuring means for detecting instantaneous positions of said main spindle and said tool slide during said profile generating movement;

means for producing measured profile data based upon said detected positions of said main spindle and said tool slide, wherein said measured profile data is composed of measured position data of said tool with respect to the rotational position change of said main spindle;

means for calculating the difference between said position data of said ideal profile data and said measured position data of said measured profile data; and decision means for ascertaining whether or not the follow delay is within a predetermined tolerance based upon said difference calculated by said calculating means.

2. A numerically controlled machine tool, which has a main spindle and tool slide controlled numerically, for grinding a non-circular workpiece according to a profile data which defines a profile generating movement of a tool along the final shape of said non-circular workpiece, said numerically controlled machine tool comprising:

ideal profile data memory means for storing ideal profile data, which is calculated from said ideal final shape of said workpiece;

execution profile data memory means for storing execution profile data calculated from said ideal profile data and which is compensated for position error due to follow delay of said numerically controlled machine tool;

control means for moving said main spindle and said tool slide according to said execution profile data so as to produce profile generation movement;

measuring means for detecting an instantaneous positions of said main spindle and for producing measured profile data which indicate actual position change of said tool slide corresponding to angle position change of said main spindle;

decision means for ascertaining whether or not the follow delay is within a predetermined tolerance by comparing said measured profile data and said ideal profile data, wherein said measuring means comprises position detecting means for detecting positions of said main spindle and said tool slide at a constant time interval, and converting means for converting positions detected by said position detecting means to said measured profile data which indicate actual position change of said tool slide corresponding to angle position change of said main spindle, and means for operating said position detecting means during spark-out machining.

3. A numerically controlled machine tool, which has a main spindle and tool slide controlled numerically, for grinding a non-circular workpiece according to a profile data which defines a profile generating movement of a tool along the final shape of said non-circular workpiece, said numerically controlled machine tool comprising:

ideal profile data memory means for storing ideal profile data, which is calculated from said ideal final shape of said workpiece;

execution profile data memory means for storing execution profile data calculated from said ideal profile data and which is compensated for position error due to follow delay of said numerically controlled machine tool;

control means for moving said main spindle and said tool slide according to said execution profile data so as to produce profile generation movement;

measuring means for detecting an instantaneous position of said main spindle and said tool slide during said profile generating movement and for producing measured profile data which indicate actual position change of said tool slide corresponding to angle position change of said main spindle;

decision means for ascertaining whether or not the follow delay is within a predetermined tolerance by comparing said measured profile data and said ideal profile data wherein said measuring means comprises position detection means for detecting positions of said spindle and said tool slide at a constant time interval; and means for operating said position detecting means during spark-out machining.

* * * * *